US006793034B2

(12) United States Patent
Raftari et al.

(10) Patent No.: US 6,793,034 B2
(45) Date of Patent: Sep. 21, 2004

(54) WHEEL-END AND CENTER AXLE DISCONNECTS FOR AN ELECTRIC OR HEV

(75) Inventors: Abbas Raftari, Northville, MI (US); Curtis Lee Tyson, Plymouth, MI (US); John O'Rear, Whitmore Lake, MI (US); Joanne Theresa Woestman, Dearborn, MI (US); Vijay K Garg, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 09/683,556

(22) Filed: Jan. 18, 2002

(65) Prior Publication Data

US 2003/0136597 A1 Jul. 24, 2003

(51) Int. Cl.[7] .............................. B60R 6/02; B60K 28/14
(52) U.S. Cl. ....................... 180/285; 180/277; 180/65.2
(58) Field of Search ................................. 180/285, 282, 180/279, 247, 242, 65.2, 277, 274; 701/22, 69, 45; B60G 21/055

(56) References Cited

U.S. PATENT DOCUMENTS

| | | |
|---|---|---|
| 4,180,138 A | 12/1979 | Shea |
| 4,511,012 A * | 4/1985 | Rauneker ................... 180/65.2 |
| 5,343,970 A | 9/1994 | Severinsky |
| 5,559,381 A | 9/1996 | Bosley et al. |
| 5,756,948 A * | 5/1998 | Husby et al. ............ 200/61.53 |
| 5,767,595 A | 6/1998 | Rosen |
| 5,816,358 A * | 10/1998 | Adler et al. ................. 180/279 |
| 5,915,488 A | 6/1999 | Fliege |
| 6,135,914 A | 10/2000 | Yamaguchi et al. |
| 6,144,128 A | 11/2000 | Rosen |
| 6,604,596 B2 * | 8/2003 | Bracke et al. ............... 180/242 |
| 2001/0017225 A1 * | 8/2001 | Yamamoto et al. ........ 180/65.2 |

* cited by examiner

Primary Examiner—Ruth Ilan
(74) Attorney, Agent, or Firm—Dykema Gossett PLLC; Carlos L. Hanze

(57) ABSTRACT

This invention is a method and system to disconnect drive wheels from the powertrain of any electric powered vehicle. A vehicle controller monitors input from, for example, an inertia switch and electric motor generator conditions and can disconnect the output shaft from the drive wheels in predetermined vehicle conditions such as during a rear-end collision, or abnormal electric motor conditions such as over-torque, over-temperature, or over-current. The invention can be configured to monitor and respond to driver demand for four-wheel drive, two-wheel drive, and neutral tow. The disconnect device can comprise a disconnect actuator and joint attached to an axle disconnect. The axle disconnect can be electric or vacuum powered and positioned as a center disconnect or a wheel-end disconnect. The invention can be configured for conventional or limited slip axles.

10 Claims, 5 Drawing Sheets

WHEEL-END AND CENTER AXLE DISCONNECTS FOR AN ELECTRIC OR HEV

BACKGROUND OF INVENTION

The present invention relates generally to electric vehicles (EVs), fuel cell electric vehicles (FCEVS) and hybrid electric vehicles (HEVs), and specifically to a method and system to disconnect an electric motor/generator powertrain from the vehicle driveline system.

The need to reduce fossil fuel consumption and emissions in automobiles and other vehicles predominately powered by internal combustion engines (ICEs) is well known. Vehicles powered by electric motors attempt to address these needs. An alternative solution combines a smaller ICE with electric motors into one vehicle. Such vehicles have the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric generator motor. The generator motor, in turn, provides electricity to a battery and a second motor, a traction motor. In the SHEV, the traction motor is the sole source of wheel torque. There is no mechanical connection between the engine and the drive wheels.

A parallel hybrid electrical vehicle (PHEV) configuration has an engine (most typically an ICE) and a motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a "powersplit" configuration. In one of several types of PSHEV configurations, the ICE is mechanically coupled to two electric motors in a planetary gear-set transaxle. A first electric motor, the generator, is connected to a sun gear. The ICE is connected to a carrier. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or driveability. The HEV allows the use of smaller engines, regenerative braking, electric boost, and even operating the vehicle with the engine shutdown. Nevertheless, new ways must be developed to optimize the HEV's potential benefits.

One such area of electric powertrain development (not only for the HEV, but any electric powered vehicle) is the need for powertrain/driveline disconnect systems. An electric motor disconnect system would provide added reliability and functionality for the vehicle and powertrain. The disconnect system in an electric powertrain configuration would be useful in a number of vehicle conditions such as a rear-end accident, motor seizure, unmitigated over-torque conditions, unmitigated motor over-temperature/current conditions, and vehicle operating modes such as flat towing (or neutral tow) the vehicle, four wheel, and two wheel drive control in vehicles that are configured as four wheel drive.

Systems to switch off electric motor power from a powertrain are known in the prior art, but systems to disconnect the electric motor driveshaft from the wheels are not known. In HEVs with electric motor drives, an inertia switch, known in the prior art, can be used to disconnect the motor from the high voltage power supply. An inertia switch can have two functions. It can stop fuel supply to the engine and high voltage power to the electric motor(s). This works well in situations such as a rear-end collision. Nevertheless, in the case of an electric drive with a permanent magnet (PM) electric motor, this strategy does not always result in reliable vehicle operation. PM motors/generators rotate at high speeds and are capable of generating very high voltages. For example, if a PM motor is operated at high speeds, traveling down a hill, and is involved in a rear-end accident, the vehicle speed can be forced above a maximum safe vehicle speed. In this condition, while the inertia switch will turn off the high voltage, turning off the high voltage power supply is not adequate. The PM motor and powertrain will continue to be connected to the vehicle driveline system and will continue to rotate and generate high voltages in the motor windings and at the motor terminals. The resultant high voltage developed at the motor terminals in this condition can cause fires or permanent damage within the powertrain such as its electronic circuit boards, capacitors, diodes, motor windings, etc.

Other types of powertrain failures in electric powered vehicles must also be anticipated. All electric powered vehicles are subject to electric motor/generator seizure and rotor lock-up due to failures that can occur internal and external of the motor/generator. Internal failures that can cause seizure include foreign debris, broken components, and coil insulation failure. External failures include sensor failure, low inverter voltage, control module failure, communications failure, and motor speed calculation failure. When these failures occur, over-current and over-temperature conditions internal to the electric motor/generator can occur, and if not caught in time, can lead to seizure and lock-up of the electric motor. In this condition, the vehicle can be forced to an unexpected and abrupt stop. Monitors and controls are known in the prior art that can mitigate these types of failures. Unfortunately, if these monitors and controls fail, severe electric motor/generator and powertrain damage can occur. For example, U.S. Pat. No. 6,135,914, to Yamaguchi et al., addresses the problem of motor speed control after a generator accident. Unfortunately, this control system assumes electronic controls are still available. Further, it does not address motor/generator over voltage and the issues related with PM motor/generator applications. Over-torque conditions can also exist in an electric vehicle such as when the torque supplied is greater than the torque requested. Too much torque can cause excessive and unexpected acceleration to occur.

Therefore, a system and method needs to be developed to monitor the electric motor and sense when lock-up occurs, disconnect the electric motor/generator and powertrain from the driveline system and allow the driver to come to a controlled stop. In cases where monitors and controllers for over-torque and over-temperature conditions fail, a powertrain disconnect needs to be developed. Ideally, this system and method can be developed using existing component technologies. Additional advantages to this disconnect system could allow a flat tow of the electric powered vehicle and to provide a four wheel or two wheel drive control.

SUMMARY OF INVENTION

Accordingly, the present invention provides wheel-end and center axle disconnects for a vehicle with an electric motor/generator powertrain attached to the vehicle driveline system, such as an electric vehicle (EV), fuel cell electric vehicle (FCEV), and hybrid electric vehicle (HEV). The present invention can monitor the electric motor/generator and sense when lock-up or failures occur, and disconnect the electric motor/generator powertrain from the driveline system. This can allow the driver to come to a controlled stop. In cases where monitors and controllers for over-torque and over-temperature conditions fail, the disconnects function as a redundant fail-safe.

The present invention in its preferred embodiment is able to use existing component technologies. Additional advantages to this disconnect system would allow neutral tow and four wheel/two wheel drive control of an electric powertrain vehicle.

Specifically, the present invention is a method and system to disconnect at least one drive wheel from the vehicle driveline system, with an electric generator/motor powertrain connected to the driveline system. The powertrain and driveline system can include an electric motor mechanically connected to an output shaft, the output shaft mechanically connected to at least one axle, the axle mechanically connected to at least one drive wheel; the axle further comprising a means to mechanically disconnect the output shaft from at least one drive wheel; a vehicle system controller comprising monitors for input from an inertia switch and electric motor/generator conditions which can activate the means to mechanically disconnect the output shaft from the drive wheels in predetermined vehicle conditions. The predetermined vehicle conditions can include activation of the inertia switch such as during a rear-end collision, or abnormal electric motor/generator conditions such as over-torque, over-temperature, or over-current. The invention can also be configured to monitor driver demand for four wheel drive, two wheel drive, and neutral tow and activate the means to mechanically disconnect the output shaft from at least one drive wheel to meet that demand.

The means to mechanically disconnect the output shaft from the drive wheels comprises of a disconnect actuator and a joint attached to an axle. The disconnect actuator can be electric or vacuum powered. The disconnect joint(s) can be positioned in a center axle or wheel-end configuration. The type of disconnect configuration used for the present invention is determined by the type of axle used in the vehicle. If the axle is a conventional type axle and open differential, it will use single or center axle disconnect. Those vehicles that use limited slip differential axle, or a transaxle will require two disconnects in a wheel-end configuration.

Other objects of the present invention will become more apparent to persons having ordinary skill in the art to which the present invention pertains from the following description taken in conjunction with the accompanying figures.

BRIEF DESCRIPTION OF DRAWINGS

The foregoing objects, advantages, and features, as well as other objects and advantages, will become apparent with reference to the description and figures below, in which like numerals represent like elements and in which.

DETAILED DESCRIPTION

Figure 1:
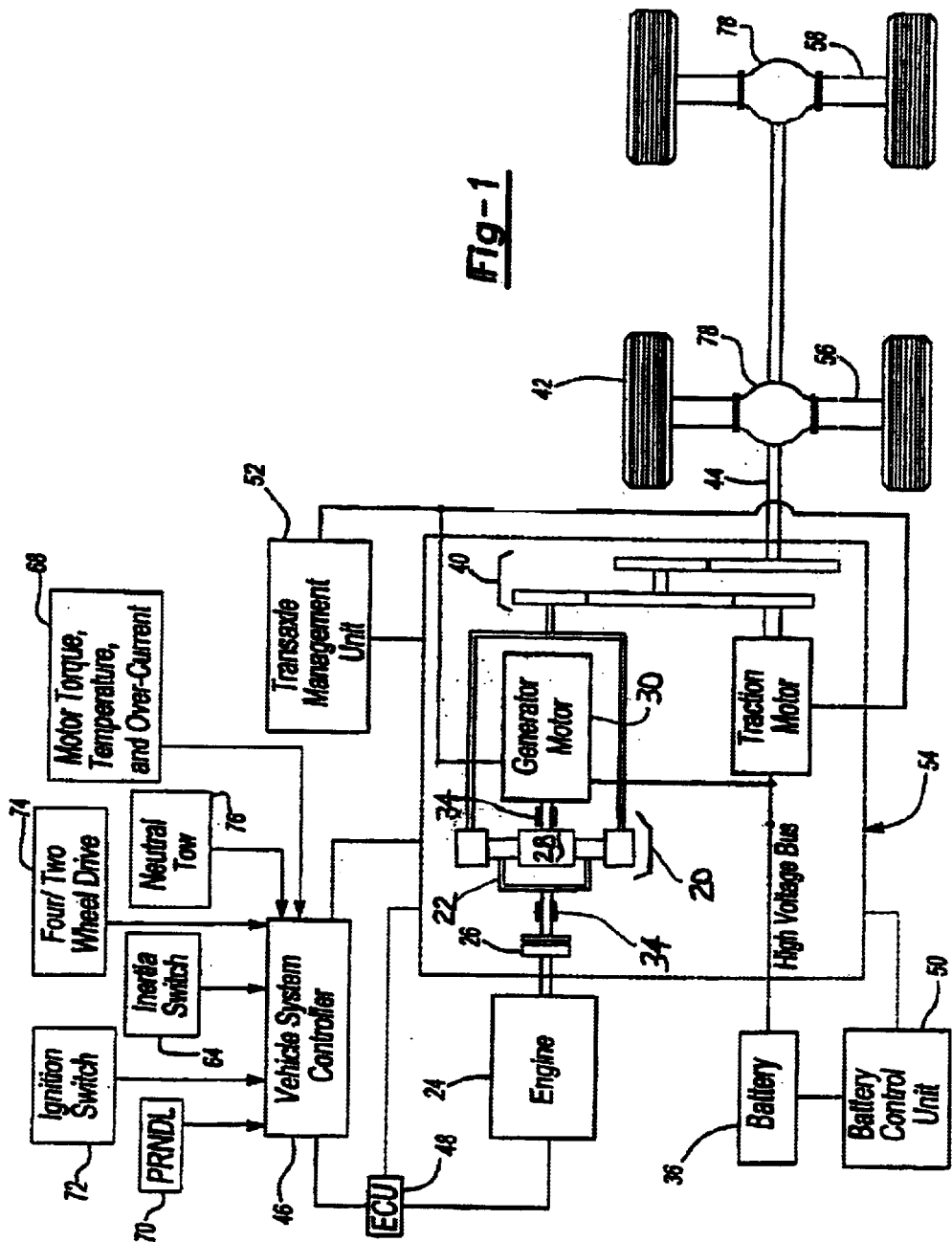
FIG. 1 illustrates a possible hybrid electric vehicle (HEV) configuration as an example of the present invention.

The present invention relates to electric powered vehicles including for example, electric powered vehicles (EVs), hybrid electric vehicles (HEVs), and fuel cell electric vehicles (FCEVs). FIG. 1 demonstrates just one possible configuration, specifically a parallel/series hybrid electric vehicle (powersplit) configuration. It is understood though that the present invention could be used in any vehicle having an electric motor/generator attached to the vehicle powertrain and provides a means to disconnect an electric motor/generator from at least one vehicle drive wheel under predetermined conditions.

In a basic HEV, a planetary gear set 20 mechanically couples a carrier gear 22 to an engine 24 via a one-way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44 connected to at least a first axle 56. Other drive wheels and axles can be included in this configuration and illustrated in FIG. 1 as a second axle 58. Each axle can connect to the output shaft 44 by means of a differential 78. The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. An engine control unit (ECU) 48 connects to the engine 24 via a hardwire interface. All vehicle controllers can be physically combined in any combination or can stand as separate units. They are described as separate units here because they each have distinct functionality. The VSC 46 communicates with the ECU 48, as well as a battery control unit (BCU) 50 and a transaxle management unit (TMU) 52 through a communication network such as a controller area network (CAN) 54. The BCU 50 connects to the battery 36 via a hardwire interface. The TMU 52 controls the generator motor 30 and traction motor 38 via a hardwire interface. The VSC 46 can receive various vehicle inputs such as PRNDL position 70 (gear shift selection for park, reverse, neutral, drive, low-drive), ignition switch position 72 (key-on, accessory, key-off), inertia switch 64 status (described below), plus four/two wheel drive option 74, or neutral tow option 76. The VSC 46 can also monitor various conditions of the powertrain such as traction motor over-torque, over-temperature, or over-current 68 and take action to mitigate these conditions.

The present invention provides a method and system to disconnect an electric motor from a vehicle driveline system. For purposes of this description the driveline system represents all components from the gear sets (for example, the carrier gear 22 and the second gear set 40) to the drive wheels 42, while the powertrain includes the driveline system and the power sources (for example, the engine 24, traction motor 38, and generator motor 30). In one embodiment of the invention, wheel-end and/or center axle disconnect joints are included in the powertrain that would disengage the rolling drive wheels 42 from the powertrain. Disconnecting the powertrain from the drive wheels 42 would mitigate the failure modes previously described.

Figure 2:
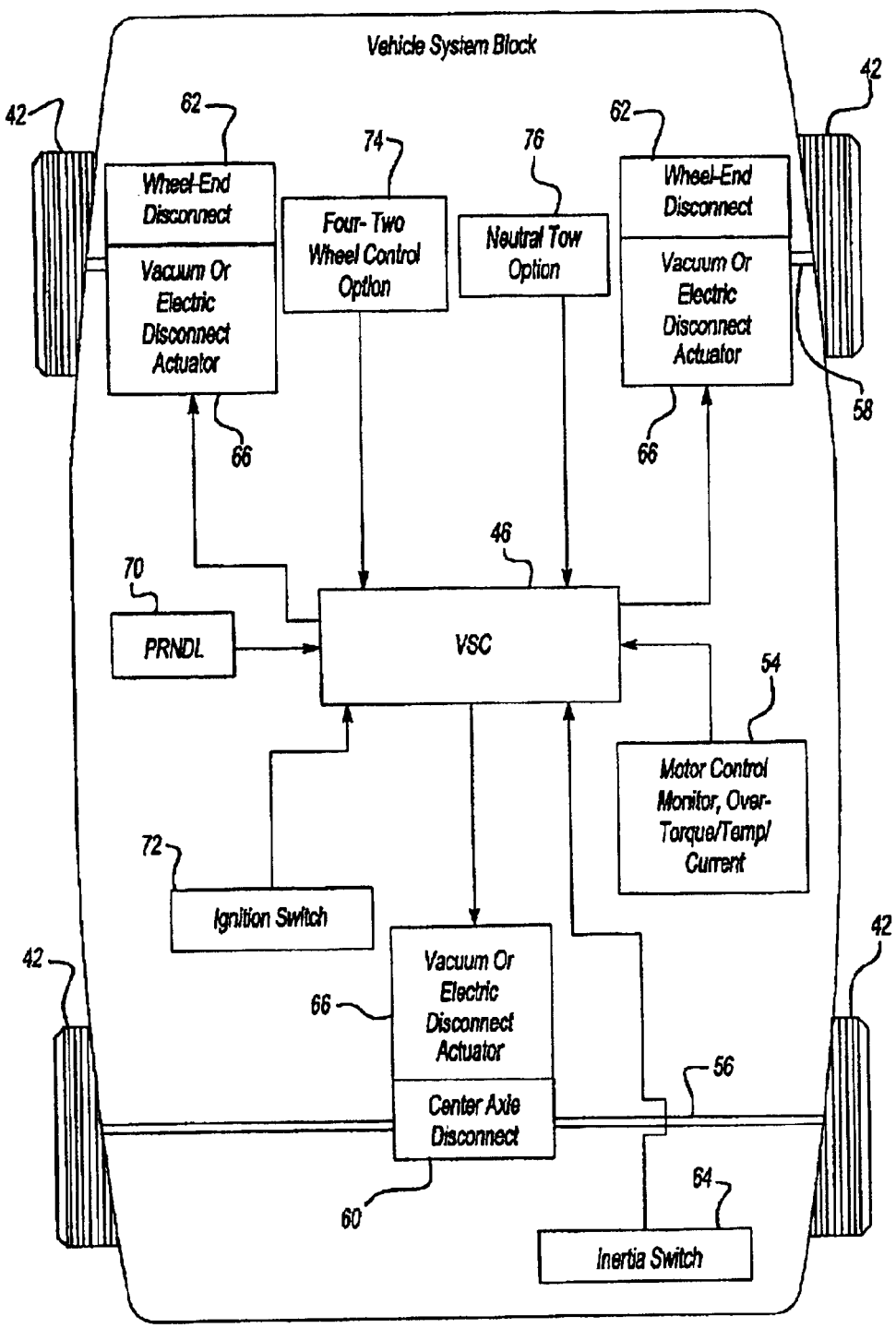
FIG. 2 illustrates an HEV powertrain with wheel-end and center axle disconnects.

FIG. 2 illustrates a possible system configuration of the present invention. The invention has a means known in the prior art to mechanically disconnect the output shaft 44 from the drive wheels 42. FIG. 2 includes an application of a center axle disconnect 60 on the first axle 56 and wheel-end disconnects 62 on the second axle 58. Several other types of configurations are possible. The wheel-end disconnect 62 is located close to a hub of a tire while the center axle disconnect 60 is located in the middle of the axle. During an event such as a rear-end collision, an inertia switch 64 can be activated and send a signal to the VSC 46. The VSC 46 (using either a separate system module or within the overall vehicle system control) could disconnect the high voltage (HV) bus and send a signal to disconnect actuators and joints 66 to disengage the drive wheels 42 from the vehicle powertrain. This would allow the traction motor 38 to coast to a complete stop under its own resistance. To re-engage the drive wheels 42, a means to reset the inertia switch 64 and re-engage the drive wheels 42 via a reset means within the inertia switch 64 could be required. This reset means within the inertia switch 64 would be required to prevent the drive wheels 42 from being engaged at any speed and thereby, keeping the HV bus turned off until the vehicle has been reset to a normal functional state. All other electrical systems would continue to function to provide power for such tasks as braking functions.

If the VSC 46 monitors the CAN 54 as to whether the traction motor 38 has seized, it could also disconnect any drive wheels 42 connected to the vehicle powertrain by activating the disconnect actuators and joints 66. Again, the disconnect (s) would disengage the drive wheels 42 from the powertrain and let the vehicle be brought to a controlled stop.

In one embodiment of the present invention, as long as the VSC 46 monitors for any predetermined conditions to disengage the drive wheels 42 and PRNDL position 70 is in any position other than "Park," the disconnects would remain disengaged to prevent further damage to the powertrain system. Re-engaging the drive wheels 42 to the powertrain would require either the predetermined condition to be removed or the PRNDL position 70 to be placed in the "Park" position. Placing the PRNDL position 70 to the "Park" position and re-engaging the drive wheels 42 to the powertrain ensures the vehicle will not move while in "Park." It will also ensure that the vehicle will remain stationary if the vehicle is shut off ( i.e., the ignition switch position 72 is in the key-off position) while the PRNDL 70 is in the "Park" position. If the vehicle is shut-off in the PRNDL position 70 other than "Park" with the disconnects disengaged, the vehicle will roll freely. This would be similar to a conventional ICE vehicle that was key-off'ed in a gear other than "Park."

When the VSC 46 is monitoring the traction motor 38 current and temperature via the CAN 54, it can determine whether any external monitors and/or controllers have failed. If mitigating actions are not taken in time to prevent the traction motor 38 from permanent damage and possible seizure, the disconnect actuators and joints 66 are activated to disconnect the powertrain from the drive wheels 42.

The VSC 46 can also monitor any traction motor 38 over-torque conditions. Over-torque conditions can be caused by the following failures: sensor failure, a controller failure, communication failure, wiring and/or connector failure, speed calculation failure, magnetic pole miscalculation, and electromagnetic noise. Each of the conditions have monitors and control systems to mitigate the failure. Nevertheless, any of these systems can fail thus allowing an over-torque condition to occur. If the VSC 46 senses an over-torque condition, the disconnect actuators and joints 66 are activated to disconnect the powertrain from the drive wheels 42.

The wheel-end 62 or center axle 60 disconnects work by utilizing a sliding collar to bridge a gap between two splined shafts. The device to control this movement may either be vacuum or electric powered. The electric powered actuators would be the most practical option for an electric or hybrid electric vehicle. The disconnects 60 and 62 are engaged in normal operating conditions to transmit torque from the powertrain to the drive wheels 42. When, for example, an inertia switch 64 is activated, current can be fed to an electric motor on the disconnect device via a controller (not shown). The electric motor disconnects move a shift fork and sliding collar so that they no longer lock the two shafts together. This allows the wheels to rotate freely without back driving the powertrain. The inertia switch 64 would require being reset to reconnect the powertrain to the wheels 42.

If the electric vehicle using the present invention has a conventional axle and an open differential 78, only one disconnect is required for both of the wheels driving that axle. A conventional axle with an open differential 78 operates according to the basic principle that the input (output shaft 44) speed is proportional (the gear ratio defines the factor) to the average of the two outputs (axle shafts that connect to the drive wheels 42). If one axle shaft is disconnected, and the vehicle is rolling, the energy will take the path of least resistance. In this case, it takes more torque for the connected drive wheel 42 to drive the input (due to the gearing in the differential, the torque to turn the traction motor 38, etc.), than it does to drive the opposite axle shaft (the portion inboard of the disconnect device and is free to rotate) backward. As such, the average speed of the outputs (−x and +x) equals zero, and the input will not rotate. Similarly, if the electric traction motor 38 was powering the wheels when the disconnect device was disengaged, the energy would again take the path of least resistance and cause the disconnected axle shaft to spin, providing no torque to the remaining drive wheel 42. Technically, each axle shaft will get equal torque, so if it takes 1 ft-lb to spin the disconnected shaft, the drive wheel 42 will also get 1 ft-lb. Picture a two-wheel drive, open differential vehicle with one drive wheel 42 on ice. When torque is applied, the drive wheel 42 on ice will spin, and the vehicle will not move.

Figure 3:
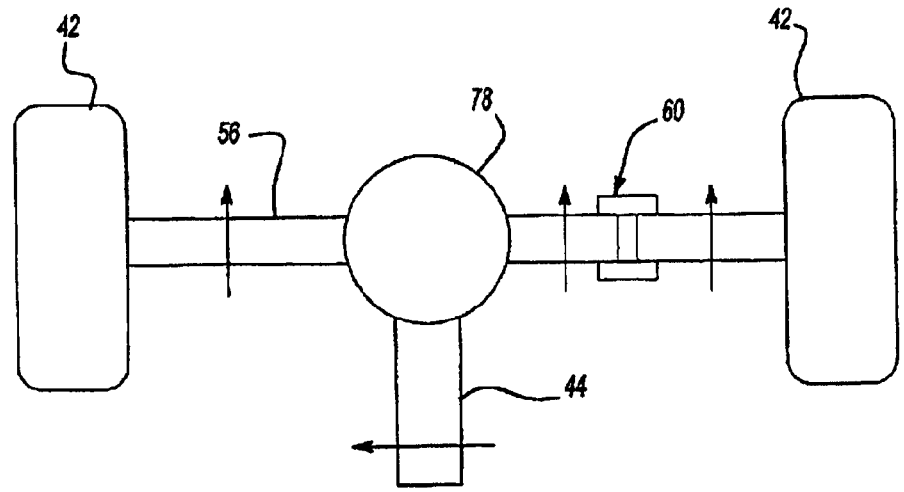
FIG. 3 illustrates the center axle disconnect of the present invention in an engaged position.
Figure 4:
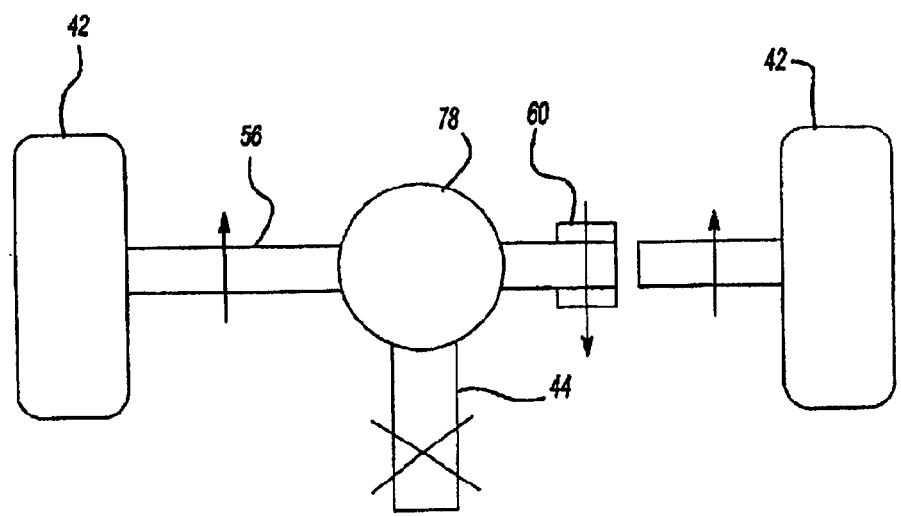
FIG. 4 illustrates the center axle disconnect of the present invention in a disengaged position.

This does not apply to a limited slip differential, since the limited slip device is always trying to maintain equal speeds between the two axle shafts. As a result, the path of least resistance could very well be the input (such as the output shaft 44 or the electric traction motor 38), depending on the design/quality of the limited slip device. This is illustrated in FIGS. 3 and 4. In FIG. 3, the center axle disconnect 60 is shown in an engaged position for only one drive wheel 42. As the drive wheels 42 rotate, the output shaft 44 also rotates. When the center axle disconnect 60 is disconnected by a coupler (not shown), the differential 78 will spin as a result of the drive wheel 44 that is still coupled. This, in turn, will cause the opposing (uncoupled) axle shaft to turn the same speed in the opposite direction. As a result, a ring and pinion within the differential 78 (not shown), and thus the rest of the powertrain will not be back driven.

Figure 5:
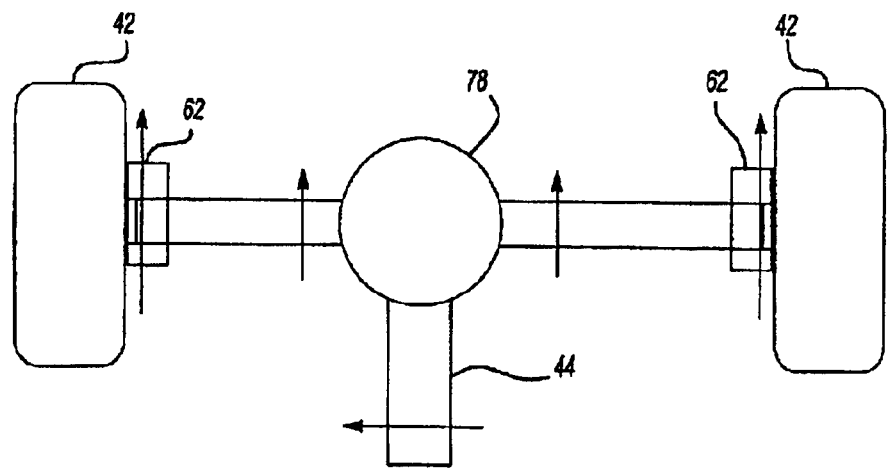
FIG. 5 illustrates the wheel-end axle disconnects of the present invention in an engaged position.
Figure 6:
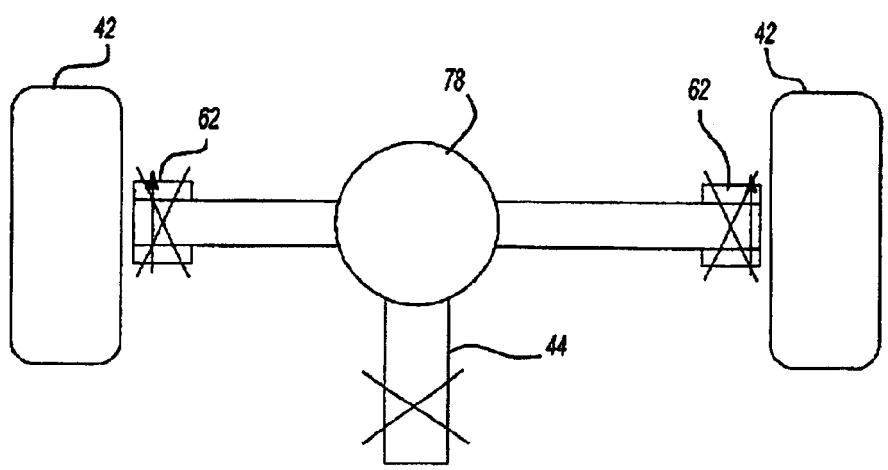
FIG. 6 illustrates the wheel-end axle disconnects of the present invention in a disengaged position.

A vehicle powertrain having a transaxle, used in front wheel drive vehicles (with transverse powertrains), packages a front differential in a transmission case. Additionally, an independent front suspension design is used in which the transaxle is rigidly attached to the vehicle, and not part of the suspension. Half shafts transmit the torque from the transaxle to the wheel-ends. Current axle disconnect systems are not easily packaged inside the transaxle, nor is there a long axle shaft to accommodate the device. The easiest packaging solution is therefore to include the disconnects at the wheel-ends. Typically, wheel end disconnects are used in pairs, although for this particular purpose, one would be feasible. The only potential issue would be slight steering effects from having one half shaft turning and the other stationary. On an axle with limited slip differential, disconnects are required for both drive wheels 42. This ensures full axle disconnect and thus prevents any powertrain damage. FIGS. 5 and 6 illustrate this type of dual disconnect configuration using wheel-end disconnects 62. In FIG. 5, the wheel-end disconnects 62 are engaged. As the drive wheels 42 rotate, the output shaft 44 will also rotate. In FIG. 6, the wheel-end disconnects 62 are in the disengaged position. As the drive wheels 42 rotate, the axle and output shaft 44 remain stationary.

Either of the wheel-end disconnects 62 or center axle disconnects 60 are suited for application within the present invention and has proven reliability and robustness in other applications such as four wheel drive powertrain disconnects.

Figure 7:
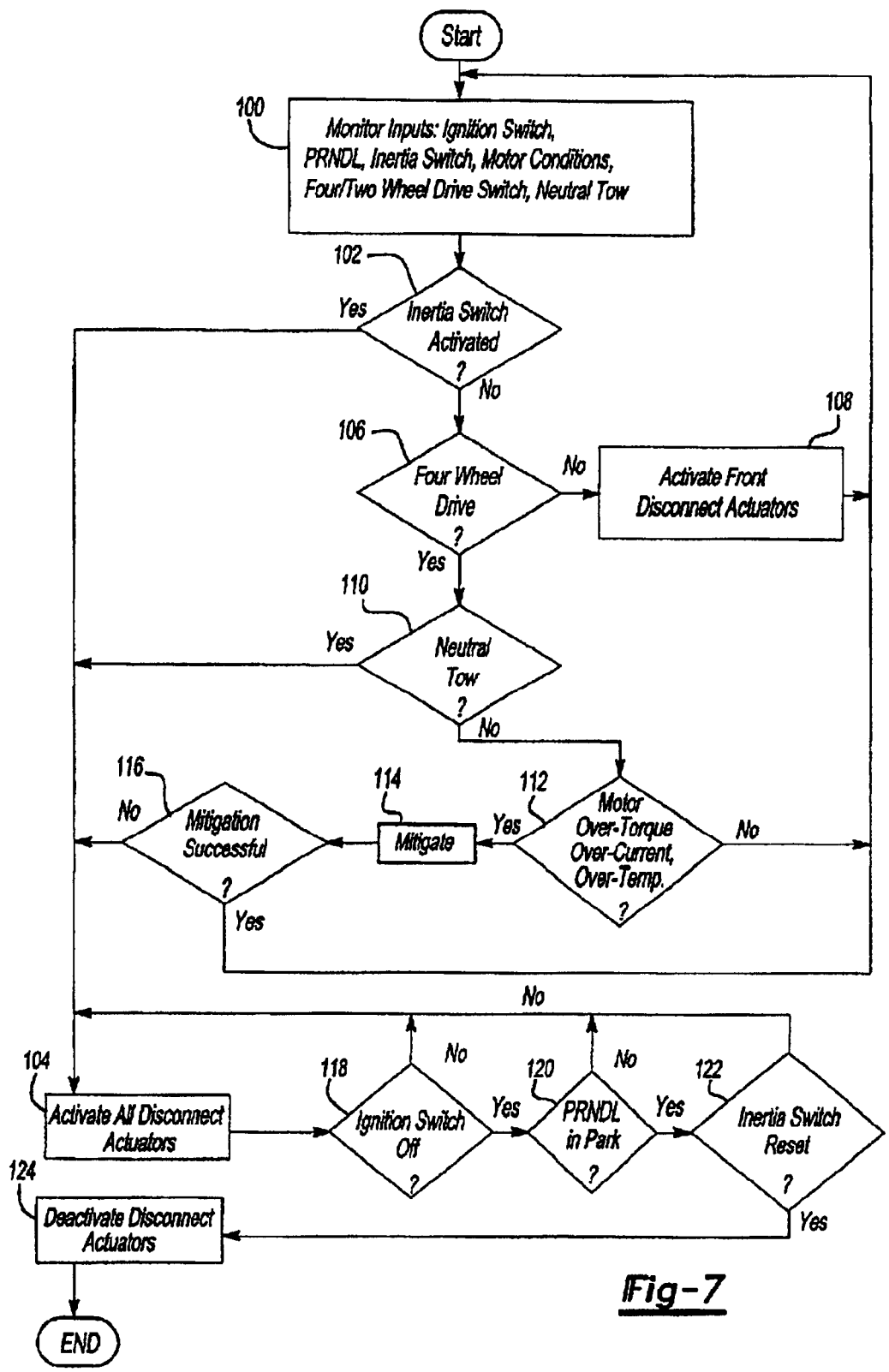
FIG. 7 illustrates a possible control strategy to implement the present invention.

To implement the invention, a possible control strategy within the VSC 46 is illustrated in FIG. 7 and can be included as part of the VSC 46. The strategy starts with each "key-on" event and ends with a "key-off" from the ignition switch 72. The strategy illustrated in FIG. 7 is for a four-wheel drive vehicle with a neutral tow option. Minor adjustments to the strategy can be made, as described below, to adapt the strategy to a two-wheel drive vehicle or a vehicle without the neutral tow option.

The strategy begins at step 100 and monitors several vehicle inputs such as ignition switch position 72, PRNDL position 70, four/two wheel drive position 74, neutral tow position 76, inertia switch status 64, and motor conditions such as over-current, over-torque and over-temperature. For a two-wheel drive vehicle, monitoring the four/two-wheel drive position would be eliminated; and, for a vehicle without the neutral tow, monitoring the neutral tow position would be eliminated.

After step 100, the strategy proceeds to step 102 and determines whether the inertia switch has been activated (such as from a rear-end collision). If yes, the strategy proceeds to step 104 and activates the disconnect actuators 66 to disconnect all drive wheels 42 connected to the powertrain. If no, the strategy proceeds to step 106.

At step 106, the strategy determines whether four-wheel drive is requested. If no, the strategy at step 108 activates disconnect actuators 66 for the front drive wheels if they are currently connected to the powertrain, then cycles back to step 100. It is noted though that any two-wheel drive wheel configuration is possible through the selection of the disconnect actuators 66 to disconnect ( e.g. , rear wheels, front wheels). If yes at step 106, the strategy proceeds to step 110. If a vehicle is only configured for two-wheel drive, the strategy could be modified by eliminating steps 106 and 108.

At step 110, the strategy determines whether neutral tow is requested by the operator. If yes, the strategy proceeds to step 104 and activates all disconnect actuators 66 connected to drive wheels 42. If no at step 110, the strategy proceeds to step 112. Again, if a vehicle is not configured for neutral tow, the strategy could be modified by eliminating step 110.

At step 112, the strategy determines whether certain abnormal motor conditions exist such as the torque, current, or temperature exceed a predetermined amount. If no, the strategy cycles back to step 100. If yes, the strategy commands at step 114 mitigating strategies to bring the motor condition within the predetermined amounts and proceeds to step 116.

At step 116 the strategy determines whether the mitigation of step 114 was successful. If yes, the strategy cycles back to step 100. If, no the strategy proceeds to step 104 and activates all disconnect actuators 66 connected to drive wheels 42.

After step 104, the strategy continues to step 118 and makes a determination whether the ignition switch is off. If no, the strategy cycles back to step 104. If yes at step 118, the strategy continues to step 120.

At step 120, the strategy determines whether the "PRNDL" is in the "P" (Park) position. If no, the strategy cycles back to step 104. If yes, the strategy proceeds to step 122.

At step 122 the strategy determines whether the inertia switch has been reset. If no, the strategy cycles back to step 104. If yes, the strategy continues to step 124.

The above-described embodiment(s) of the invention are provided purely for purposes of example. Many other variations, modifications, and applications of the invention may be made.

What is claimed is:

1. A system to disconnect at least one drive wheel from a vehicle with an electric motor connected to a powertrain, comprising:

the powertrain having said electric motor mechanically connected to an output shaft, the output shaft mechanically connected to at least one axle, the axle mechanically connected to at least one drive wheel;

the axle further comprising a means to mechanically disconnect the output shaft from at least one drive wheel;

a vehicle system controller ("VSC") receiving input from an inertia switch and electric motor condition sensors, with said VSC activating said means to mechanically disconnect the output shaft from the drive wheels in the event that the inertia switch is activated, with said VSC further comprising a subsystem to monitor whether a means to reset an activated inertia switch has been activated and which accordingly deactivates said means to mechanically disconnect the output shaft from the drive wheels.

2. The system of claim 1 wherein the means to mechanically disconnect the output shaft from the drive wheels comprises a disconnect actuator and joint attached to an axle disconnect.

3. The system of claim 2 wherein the axle disconnect is electric powered.

4. The system of claim 2 wherein the axle disconnect is vacuum powered.

5. The system of claim 2 wherein the axle disconnect is a center disconnect.

6. The system of claim 2 wherein the axle disconnect is a wheel-end disconnect.

7. The system of claim 6 wherein the axle is limited slip axle.

8. A method for disconnecting at least one drive wheel from a vehicle with an electric motor connected to a powertrain, and having said electric motor mechanically connected to an output shaft, the output shaft mechanically connected to at least one axle, the axle mechanically connected to at least one drive wheel, the steps comprising:

monitoring input from an inertia switch and electric motor conditions;

determining whether the inertia switch has been activated; and disconnecting the output shaft from at least one drive wheel in the event that the inertia switch has been activated.

9. The method of claim 8 wherein the step of disconnecting the output shaft from at least one drive wheel uses electric power.

10. The method of claim 8 wherein the step of disconnecting the output shaft from at least one drive wheel uses vacuum power.

* * * * *